(12) United States Patent
Loeb et al.

(10) Patent No.: US 8,417,262 B2
(45) Date of Patent: Apr. 9, 2013

(54) SYSTEM AND METHOD FOR PRIVACY-ENABLED MOBILE LOCATOR SERVICES WITH DYNAMIC ENCOUNTER HORIZON

(75) Inventors: Shoshana K. Loeb, Philadelphia, PA (US); Benjamin Falchuk, Upper Nyack, NY (US)

(73) Assignee: TTI Inventions D LLC, Wilmington, DE (US)

( * ) Notice: Subject to any disclaimer, the term of this patent is extended or adjusted under 35 U.S.C. 154(b) by 528 days.

(21) Appl. No.: 12/617,844

(22) Filed: Nov. 13, 2009

(65) Prior Publication Data

US 2010/0233999 A1  Sep. 16, 2010

Related U.S. Application Data

(60) Provisional application No. 61/159,977, filed on Mar. 13, 2009.

(51) Int. Cl.
  *H04W 24/00* (2009.01)

(52) U.S. Cl.
  USPC .......... 455/456.2; 455/412.2; 455/414.3; 455/456.3; 455/457; 455/466; 455/517; 709/206

(58) Field of Classification Search ....... 455/456.1–457, 455/412.1–412.2, 414.1–414.4, 517–521; 709/203–206
  See application file for complete search history.

(56) References Cited

U.S. PATENT DOCUMENTS

| | | | | |
|---|---|---|---|---|
| 6,101,391 A * | 8/2000 | Ishizuka et al. | ............... | 455/457 |
| 6,301,609 B1 * | 10/2001 | Aravamudan et al. | ........ | 709/207 |
| 6,463,471 B1 * | 10/2002 | Dreke et al. | ................. | 709/224 |
| 6,681,108 B1 * | 1/2004 | Terry et al. | ................. | 455/412.2 |
| 6,735,430 B1 * | 5/2004 | Farley et al. | ............... | 455/414.1 |
| 7,080,139 B1 | 7/2006 | Briggs et al. | | |
| 7,346,658 B2 * | 3/2008 | Simpson | ....................... | 709/205 |
| 7,369,867 B2 | 5/2008 | Zabawskyj et al. | | |
| 7,590,696 B1 * | 9/2009 | Odell et al. | .................... | 709/206 |
| 7,823,073 B2 * | 10/2010 | Holmes et al. | ................ | 715/753 |
| 8,249,078 B1 * | 8/2012 | Hassan et al. | ............ | 370/395.21 |
| 2004/0142709 A1 * | 7/2004 | Coskun et al. | ................ | 455/466 |
| 2004/0153506 A1 | 8/2004 | Ito et al. | | |
| 2005/0227676 A1 * | 10/2005 | De Vries | .................... | 455/414.1 |
| 2005/0239448 A1 | 10/2005 | Bayne | | |
| 2006/0223518 A1 * | 10/2006 | Haney | ........................ | 455/420 |

(Continued)

FOREIGN PATENT DOCUMENTS

| | | |
|---|---|---|
| JP | 2001-059740 | 3/2001 |
| KR | 1020060011298 | 2/2006 |
| KR | 1020060124865 | 12/2006 |
| KR | 20080081686 | 9/2008 |

OTHER PUBLICATIONS

International Preliminary Report on Patentability for PCT/US/10/27069, completed Feb. 12, 2011.
Written Opinion for PCT/US10/27069, mailed Apr. 15, 2010.
International Search Report, dated Apr. 15, 2010 (2 pages).

*Primary Examiner* — Sharad Rampuria

(57) ABSTRACT

A method and system for managing awareness information relating to a mobile device's visibility with respect to other buddy devices, the system comprising; the mobile device, a mobile application listing one or more buddies, an application listener which tracks the one or more buddies zoom operations and radar zoom factors, and a server, the server comprising an encounter manager, an approach manager and a notification marshalling system.

30 Claims, 5 Drawing Sheets

U.S. PATENT DOCUMENTS

2007/0143423 A1 6/2007 Kieselbach et al.
2008/0070593 A1 3/2008 Altman et al.
2008/0108330 A1* 5/2008 O'Neil et al. .............. 455/414.1
2008/0132252 A1 6/2008 Altman et al.
2009/0031006 A1 1/2009 Johnson
2009/0177695 A1* 7/2009 Mahajan et al. ........... 707/104.1

* cited by examiner

SYSTEM AND METHOD FOR PRIVACY-ENABLED MOBILE LOCATOR SERVICES WITH DYNAMIC ENCOUNTER HORIZON

CROSS REFERENCE TO RELATED APPLICATIONS

This application is related to and claims priority to U.S. Provisional Application Ser. No. 61/159,977 filed on Mar. 13, 2009, the entire contents and disclosure of which is incorporated herein by reference.

FIELD OF THE INVENTION

This invention relates to mobile devices, communication systems and location privacy.

BACKGROUND OF THE INVENTION

Mobile communication devices including cell phones, PDA's and smart phones have become commonplace in our society. Most mobile telephones are no longer just used as a telephone device; rather these devices have much more sophisticated applications. For example, smartphones are capable of e-mail, internet access, text messaging, SMS messaging and providing GPS directions. Many smartphones can also track user location, and allow users to opt-in to disclose their location information to a list of "buddies." These buddies can use their mobile devices to determine other buddies' locations providing the queried buddies have granted the querying buddies access (e.g., via a buddy list).

"Mobile Find my Buddy" applications are those in which a mobile device application displays a map on the screen of the mobile device and plots the locations of a given user's buddies. This is done via interworking with one or more servers in the network that store and manage user identities and locations. These systems may or may not also represent those buddies' present status (e.g., busy, listening to music, etc.). The screen on which one buddy sees his/her other buddies is sometimes referred to as the "radar." It is rendered on the mobile device and sometimes on a desktop device as well. These applications are also known as "buddy trackers," "friend locators" among others.

In existing buddy applications, the applications report the location of the users to a server. The buddy application then pulls locations of the users' buddies and displays them on a map for the user. As the user pans and zooms in his/her radar screen, the user's map can then display new buddies now within range. As buddies pan and zoom in their radar screens, the buddies map can then display the user's location previously not in the range of the buddies' radar screen.

FIG. 1. is an illustration of the present model of buddy locator services. A user 2 enters identifying information of a buddy 4 into the application 3 on the user 2's mobile device. Buddy 4 enters the identifying information of user 2 into the application 5 on the buddy 4's mobile device. Both user application 3 and buddy application 5 can be the same obtained software program. Both user 2's application 3 and buddy 4's application 5 send location information to a server 6. Server 6 sends user 2's location information to buddy 4's application 5. Server 6 also sends buddy 4's location information to user 2's application 3. If the map view of user 2's application 3 encompasses the location buddy 4 is in, buddy 4's location will be indicated. If the map view of buddy 4's application 5 encompasses the location user 2 is in, user 2's location will be indicated.

The present model of these buddy locator services allow users to opt-in to being visible to a pre-defined group of buddies. Users can modify the group and also can change their visibility (e.g., be visible, invisible etc.) to the buddy list group as a whole or to individuals on the buddy list. For users to make themselves invisible to others on their buddy list, they typically have to manually change the settings on their mobile devices.

As more and more services become available, it becomes increasingly difficult for a given user to keep track of which of their buddies they should be visible to and which they should not at a point in time or place. For example, if a user has two or three different buddy lists with two or three buddy mapping services, it quickly becomes difficult to manage visibility on a buddy by buddy basis. Further, it becomes harder to change settings for each individual buddy when you don't know his/her location or whether he/she will be viewing your location in the near future. For a variety of reasons, a user may want to have awareness of his visibility across a variety of other buddies' and groups devices through time and location.

For users, manually making themselves invisible or stopping the service during times when they want privacy is annoying, disruptive, and time consuming. Simply shutting off the buddy mapping service will affect all of the user's buddies, a consequence that may not be desired. Having to turn off visibility on a per buddy basis, in turn, forces the user to manage a potentially large set of individualized settings and quickly becomes infeasible with scale.

The services presently available do not provide any advanced warning or awareness to a user as to which of the buddies on the user's buddy list is viewing the user's location, or when one of the buddies on the user's buddy list will be viewing the user's location in the near future, either by the buddy physically travelling into a specified range around the user, or the buddy searching a map on the buddies' mobile device. Presently, the user must assume that for all of the buddies listed on all of the user's buddy applications for whom the user has set a visible status, the user may appear on those buddies' radar screens at any time.

Accordingly, there is a need for a user of a buddy, mapping application to be notified based on the actions of any or all individual listed buddies and to have visibility options prior to becoming visible to buddies.

SUMMARY OF THE INVENTION

Accordingly, disclosed is a system for managing a mobile device's visibility with respect to mobile buddy mapping applications and for increasing end users' awareness of their own visibility in near real-time. The system for managing a mobile device's visibility comprises a mobile device, a mobile application listing one or more buddies, an application listener which tracks the one or more buddies' map interactions (e.g., zoom factors, pan operations, etc.; the map is often presented to appear similar to a "radar screen" on buddy mapping graphical interfaces), and a server, the server comprising an encounter manager, an approach manager and a notification marshalling system.

The system can also include a learning component. The encounter manager of the system can receive input regarding various encounter horizons.

Also disclosed is a method for managing a mobile device's visibility. The method for managing a mobile device's visibility comprises the steps of inputting one or more buddies into a user's mobile application, listening to the one or more buddies zoom operations and radar zoom factors, determining an impending detection of the user's location, notifying the user that their location will be detected by the one or more buddies, and choosing a visibility option.

The method for managing a mobile device's visibility can provide the choice of several visibility options including—but not limited to—the option to appear, not appear, appear anonymously or appear at a later time on the buddy's radar.

In the method managing a mobile device's visibility, notification of a user's impending detection can occur at a predetermined context related to the encounter horizons of the parties in question. This notification can be a textual message notification and/or a graphic message notification.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION

Definitions

For purposes of the description in this application the following definitions shall apply.

Server shall mean any centralized application device that receives updates from a plurality of user equipment.

Radar screen shall mean a map view of specific physical dimensions seen on a user's mobile device or a buddy's mobile device. Radar screen is typically managed and presented by a mobile application 14, which is further described below.

Figure 2:
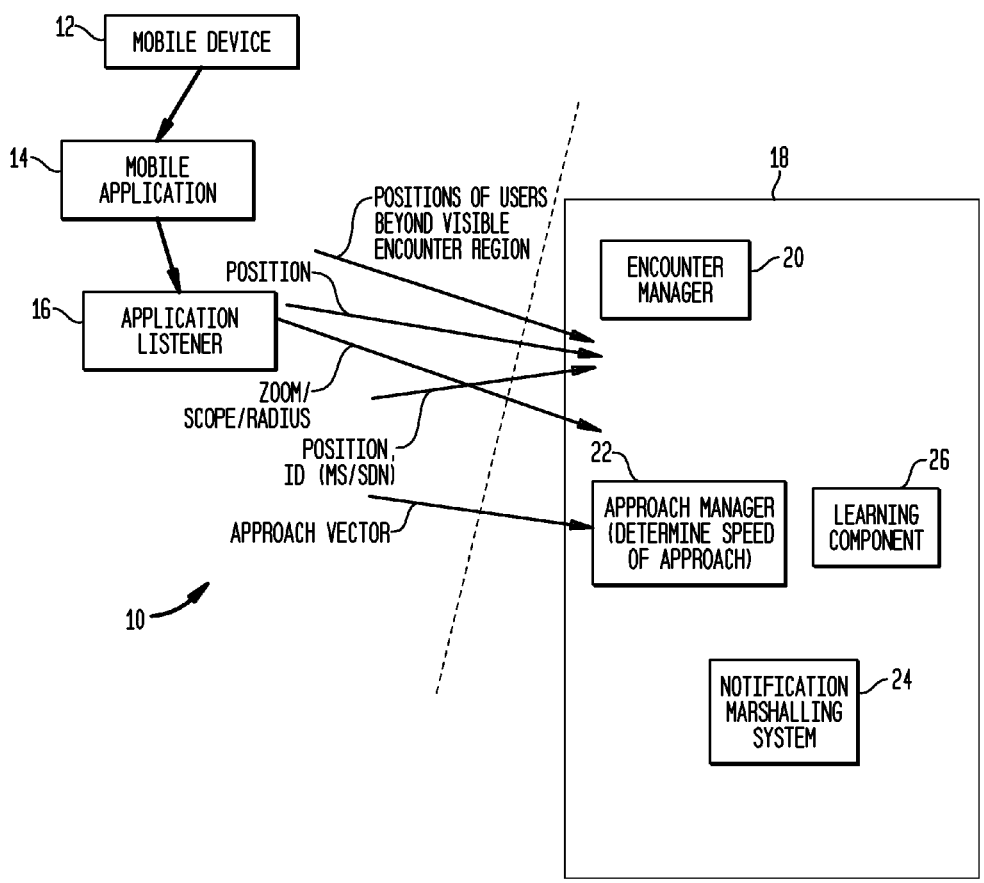
FIG. 2 illustrate an exemplary architecture for a system for managing a mobile device's visibility.

The present application is directed towards a method and system for managing a mobile device's visibility. FIG. 2 illustrates an example of the system for managing a mobile device's visibility 10 which includes the following components, a mobile device 12, the mobile application 14 listing one or more buddies, an application listener 16 which tracks the one or more buddies' zoom operations and radar zoom factors, and a server 18, the server 18 comprising an encounter manager 20, an approach manager 22 and a notification marshalling system 24. Server 18 can also include a learning component 26.

The method for managing a mobile device's visibility comprises the following steps, which are further described below in the description of the system for managing a mobile device's visibility. The first step of the method for managing a mobile device's visibility is inputting identification information of one or more buddies into a user's mobile application. The user's application listens (by receiving updates) to the activity of one or more buddies as they move geographically and change the scope and area on their radar screens. If while during the listening period, the user's application determines that the user is subject to an impending detection by one or more buddies, the application will notify the user that his or her location will be detected by the one or more buddies. The criteria defining "impending detection"—also known as visibility awareness—can be set at different levels for different buddies and notifications can be sent earlier for some buddies and later for other buddies. Notification urgency can also be based on settings on a per buddy or on a global buddy list level. Upon notification, the user will then have several visibility options to choose from including but not limited to "make me visible", "do not make me visible", "let me be seen anonymously", or "let me be seen anonymously with one or more specified attributes", or "let me be seen at a point later in time (perhaps anonymously) by the one or more buddies." The previously listed visibility options are by no means exhaustive, other visibility options are possible.

The system for managing a mobile device's visibility includes a mobile device 12 which can be any mobile device capable of supporting mobile application 14, including but not limited to cellular telephones, PDA's, smart phones and laptops. Mobile application 14 is supported by a user's mobile device 12. Mobile application 14 accepts inputs of one or more buddies' identifying information, which mobile application 14 stores as a list. The buddy would also have the user's identifying information. As part of mobile application 14, application listener 16 is a component that integrates with and synchronizes with a mapping part of mobile application 14 on mobile device 12. Both the user and buddy would have substantially the same mobile application 14 on their individual mobile devices 12. Both the user and buddy would also have substantially the same individual application listeners 16 as part of their mobile applications 14 on their individual mobile device 12. As buddies listed in mobile application 12 physically move or move the scope appearing on their radar screen, application listener 16 listens for these map change events including the buddy physically moving, the buddy panning north, south, east or west or the buddy zooming in and out (e.g., pan and zoom actions occur via interactions with the mobile application 14 and are heard by the application listener 16).

Application listener 16 is in communication with server 18. Server 18 contains encounter manager 20, approach manager 22 and notification marshalling system 24. Encounter manager 20 is a component that stores near real-time information relating to user location and user proximity to other objects, and captures how and when the system should respond to users becoming visible or their future visibility predicaments. Seen on a map, encounter horizons are typically circular shapes emanating from the user's location. While encounter horizons are managed by the system and may be created automatically, information inputted by the user (e.g., distances, actions) may be used to create encounter horizons. For example, the user may set up encounter horizons at various distances around his current location to be triggered when a particular buddy or group of buddies crosses it. If a buddy in the real-world crosses the encounter horizon's logical demarcation point or moves the scope of the radar screen to cross the encounter horizon, encounter manager 20 will notify notification marshalling system 24.

Encounter manager 20 can receive input to set up several encounter horizons at varying distances with a different weighting or importance assigned to the respective encounter horizons. For example, if a buddy physically crosses the encounter horizon which is furthest away from the user or moves the scope of the radar screen to cross the outermost encounter horizon, which is furthest away from the user, this event can be assigned a low weighting. A low weighting can mean a notification, as described below, which is indicative of this level of importance or weight. Different weightings may be assigned to different buddies listed in the user's mobile application 14. For example, weightings of encounter horizons increasingly closer to the user can be tagged with increasingly important weights, which will, in turn, allow the system to respond with an urgency proportional to distance. Encounter manager 20 can store preferences which are input by the user for importance of each of the buddies on the user's buddy list entering a specific encounter horizon. For example, the manager 20 can give some buddies a higher importance at further distances and some buddies a lower importance at closer distances.

Server 18 also includes approach manager 22. Approach manager 22 receives information from external systems relating to speed and direction of travel of a given buddy or group of buddies. By caching some previous data, approach manager 22 can compute direction and speed and store it. The system can use current location and direction and speed to estimate when encounter horizons will be crossed. If a buddy physically moves or moves the scope of his radar screen and the approach manager 22 determines, for example, based on the speed of movement and vector of approach, that a buddy's movement will place the user within the buddy's radar screen, approach manager 22 can notify notification marshalling system 24 to transmit the appropriate warning.

Upon receiving information from either encounter manager 20 or approach manager 22 that a buddy's radar screen is or soon will be encompassing an area where the user is located, notification marshalling system 24 can send a notification to the user, giving the user visibility options. Notification marshalling system 24 can send a notification which can include a statement such as, "You will be visible on buddy B's radar screen in 5 minutes" or "You are about to be visible on buddy B's radar screen" Notification marshalling system 24 can be programmed to send a textual notification to the user, such as a text message or e-mail, or a graphical notification such as a picture or video.

Notification marshalling system 24 also can send several visibility options to the user, from which the user can pick. These visibility options can include the following. Notification marshalling system 24 can send a visibility option to the user which, upon choosing by the user, will allow buddy B to see the user on his/her or the radar screen. Notification marshalling system 24 can send a visibility option to the user which, upon choosing by the user, will not allow buddy B to see the user on the radar screen, thus cloaking the user's location. Notification marshalling system 24 can send a visibility option to the user which, upon choosing by the user, will allow buddy B to see the user on the radar screen, but as an anonymous person. The user can enter into the user's mobile application 14 what will be displayed on buddy B's radar screen if the user chooses the anonymous visibility option. User can enter an anonymous profile into the user's mobile application 14, such as display "30 year old male" when the user chooses the anonymous visibility option instead of any identifying material. Notification marshalling system 24 can also send a visibility option to the user which will allow buddy B to see the user on the radar screen, but after a predetermined time. The user can enter into the user's mobile application 14 how long this time period will be.

If the user does not respond to the visibility options sent by notification marshalling system 24, the user will remain cloaked from view on buddy 13's radar screen. The user can also enter into the user's mobile application 14 to automatically let specific buddies see him without responding to a visibility option.

The user's visibility choice is captured and processed by server 18 and then sent to buddy 13's application listener 16. Buddy B's application listener 16 can display user if user has allowed his location to be seen, cloak the user if the user has chosen to not allow his location to be seen, display the user as anonymous, or display the user after a period of time. Alternatively, the instrumentation to affect the user's visibility may be on one of server 18's components.

Server 18 can also include learning component 26 which can use standard techniques to learn from how the user responds to visibility options from each individual buddy over time. Learning component 26 can create heuristics that can allow learning component 26 to eventually make visibility option decisions for the user automatically. For example, if the user always allows a certain buddy to view the user's location between the hours of 8 AM and 10 PM, learning component 26 can automatically choose the visibility option that would allow the buddy to see the user during those hours. The learning component can employ various neural nets algorithms as well as statistical correlation methodologies to come up with the heuristics. Having such heuristics adds to the usability of the system as it will not require the user to specify visibility options explicitly. Once the learning component infers a visibility option it will ask the user to approve that option.

The described system and method manages a mobile device's visibility to the buddies on a user's buddy list and warns a user when his visibility will be divulged. This results in better privacy control for the user. Additionally, the user will receive information regarding the buddy trying to view the user, giving the user's privacy choice the proper information needed to choose a visibility option if a per-buddy warn policy is desired.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

Examples

Conditions for the following examples include the condition that the user in question has opted-in to the mobile buddy mapping service and carries his mobile device which is loaded with the software and instrumentation of the present invention in addition to the mobile buddy mapping service. Further, it is a condition that in the mobile buddy mapping service, the user has buddy lists containing a buddy, and the buddy has a buddy list including the user. Another condition is that user and buddy locations are captured or visible to application components by, for example, partnering with location providers or interfacing with Geographic Positioning System (GPS) hardware. The examples, unless otherwise stated the user and the buddy may be immobile or mobile travelling at various speeds and in various directions without affecting the outcome.

Example 1

System set up. The user sets up global "encounter horizons" transition actions, or the system will apply some default rules based on some categorization of the user. The user can set up per-buddy encounter horizon transition actions or the system can apply a global rule. The user sets up an anonymized profile (e.g. "identify me as x, y or z when I allow myself to be seen anonymously") which can be customized to the individual buddy or set globally. The user sets up personalized notification policies on what kinds of messages the system should deliver and how they should be delivered. For example, the system can send text messages, e-mails, video messages, picture messages, etc.

Example 2

Figure 3:
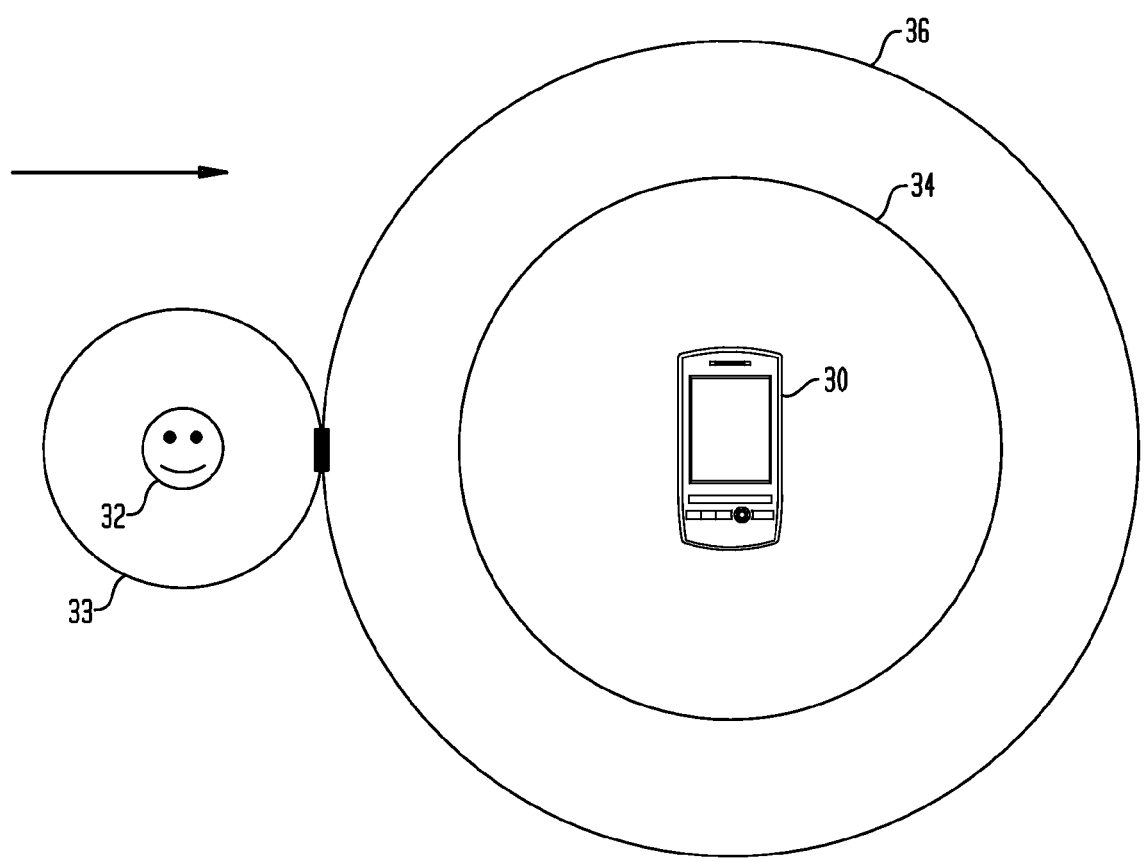
FIG. 3 illustrates an example of the situation where a buddy is approaching a user.

Example of when a buddy is approaching a user. As illustrated in FIG. 3, user 30 is stationary at position $P_u$ and buddy 32 is moving at a velocity of $V_b$ towards $P_u$. User 30 has set encounter horizon transitions for distances $r_1$ 34 and $r_2$ 36 ($r_1<r_2$). The user can set several more encounter horizon transitions if desired. Buddy 32's current radar view shown on buddy 32's mobile device is represented by buddy horizon 33. As buddy horizon 33 crosses encounter horizon transition $r_2$ 36, the system triggers an event (text message, etc) and stores buddy 32's radar view. As buddy horizon 33 crosses encounter horizon transition $r_1$ 34, the system determines, based on buddy horizon 33 and buddy 32's computed speed, that it is time to notify user 30 that he will soon be visible on buddy 32's radar. The system then sends a message, providing visibility options such as make me visible, cloak me, show me anonymously and make me visible in 10 minutes, etc., to user 30. User 30 can input options that keep user 30 cloaked until he answers or makes him visible after a certain time on a per buddy or a global basis. After user 30 chooses a visibility option, user 30 will either appear on buddy 32's radar identified as the user, appear on buddy 32's radar anonymously, not appear on buddy 32's radar at all, or appear on buddy 32's radar at a later time.

Example 3

Figure 4:
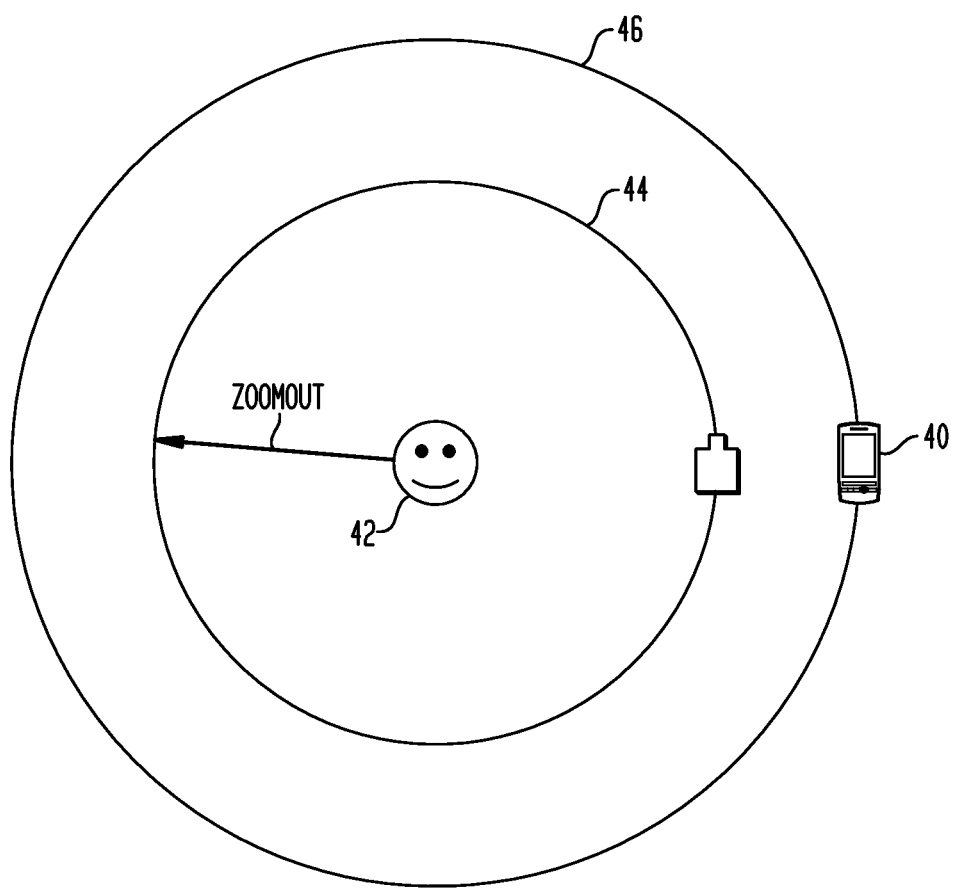
FIG. 4 illustrates an example of the situation where a buddy is changing his zoom factor and the user is stationary.

Example of when a buddy is changing his zoom factor and the user is stationary. As illustrated in FIG. 4, user 40 is at position $P_u$ and buddy 42 is at position $P_b$. Buddy 42's current radar view shown on buddy 42's mobile device is represented by buddy horizon 44. User 40 is presently not visible on buddy 42's radar because $P_u$ is outside the scope of buddy horizon 44. In FIG. 4, buddy 42 begins to zoom out on buddy 42's radar, so that the radar screen starts showing a larger geographical area, or buddy 42 begins to move the scope of buddy 42's radar to cover a different geographic area. The application listening component of buddy 42's application records the zoom operation, each move of buddy 42's radar scope causes a message to be marshaled and sent to the server. The server tracks the implications of buddy 42's zoom operation. After a few zoom operations, it becomes clear that buddy horizon 44 will soon encompass user 40's position. Prior to buddy 42's zoom operation that would place user 40 within buddy 42's radar, the system infers that the new region would threaten to make user 40 visible and the application listening component 16 of user 40's application notifies user 40 of impending visibility and gives user 40 visibility options such as make me visible, cloak me, show me anonymously and make me visible in 10 minutes, etc. User 40 can either respond or, if user 40 is not currently with his device, pre-set actions including an automatic cloak decision or automatic make me visible action can be taken. If user 40 does choose a visibility option, user 40 will either appear on buddy 42's radar identified as the user, appear on buddy 42's radar anonymously, not appear on buddy 42's radar at all or appear on buddy 42's radar at a later time. The server responds to buddy 42's application listeners' notification with user 40's choice and will either show user 40 on buddy 42's radar, not show user 40 on buddy 42's radar, show user 40's anonymous profile or show user 40 at a later time.

Alternatively, if buddy 42 uses pan operations to change his map view, instead of a zoom operation, and those views would threaten to make user 40 visible, then the system takes similar steps to ensure that user 40 is made aware of the impending visibility and given visibility options.

Example 4

Example when a buddy is zooming out while both the buddy and a user are moving towards each other. This example is very similar to example 3, except that the system now tracks the buddy's motion as well as the buddy's radar view at every zoom operation. Either the buddy can enter the user's outermost boundary or the user can move to a point where the buddy is within the user's outermost boundary. The fact that the user is moving does not affect the system.

Example 5

Figure 5:
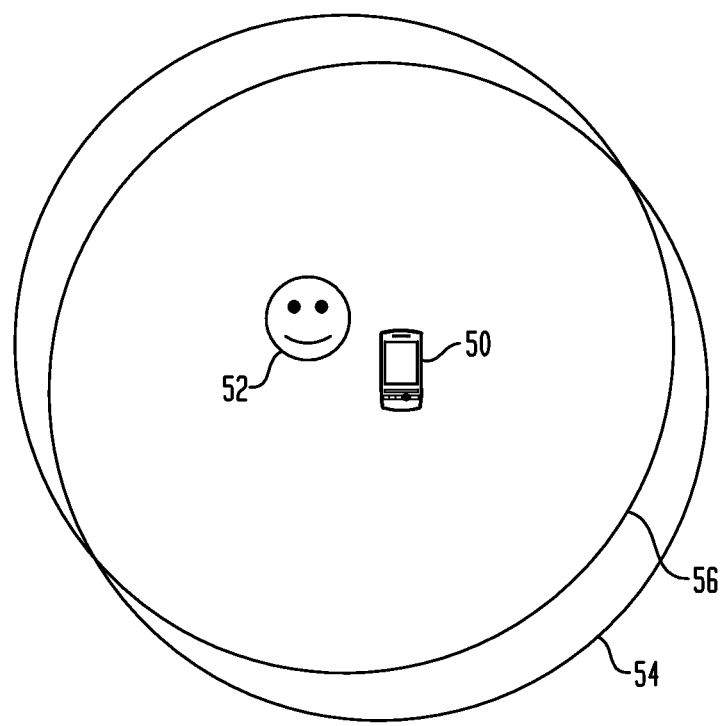
FIG. 5 illustrates an example of the situation where a buddy turns on his device with the mapping zoom factor such that the buddy map view already encompasses a user's position.

Example when a buddy turns on his device with the radar zoom factor already encompassing a user's position. As illustrated in FIG. 5, a user 50 and a buddy 52 are near each other, within buddy 52's buddy horizon 56 if buddy 52's mobile device were on, but buddy 52's device is off. Buddy 52 then turns on buddy 52's mobile device, the application 14 and the application listening component 16 of buddy 52's device send a message to the server 6 indicating the "power on" event and can also include a message concerning buddy 52's initial buddy horizon 56. The server then checks to see which users will be visible on buddy 52's radar, consequently inferring that user 50 will be. The server sends a message to user 50, giving user 50 visibility options such as make me visible, cloak me, show me anonymously and make me visible in 10 minutes etc. Based on user 50's response, buddy 52's radar view will have user 50 appear identified as himself, appear anonymously, not appear at all or appear at a later time. If user 50's application has been set up by user 50 to automatically allow user 50 to be visible to buddy 52, the server 6 will then contact buddy 42's application listening component to make user 50 visible in buddy 52's radar view.

What is claimed is:

1. A method comprising:
   receiving, at a first mobile device, a notification that a second mobile device associated with a buddy of a user of the first mobile device is going to detect a location of the first mobile device;
   receiving, in response to the notification, a visibility designation, wherein the visibility designation specifies a desired visibility of the first mobile device by the second mobile device; and
   providing the visibility designation to a server that is in communication with the first mobile device and the second mobile device.

2. The method of claim 1, wherein the visibility designation controls privacy of the first mobile device by preventing the second mobile device from receiving the location of the first mobile device.

3. The method of claim 1, wherein the visibility designation prevents the second mobile device from receiving an identity of the user of the first mobile device.

4. The method of claim 1, wherein the visibility designation identifies a time at which the second mobile device is able to receive the location of the first mobile device.

5. The method of claim 4, wherein the time is specific to the second mobile device.

6. The method of claim 1, further comprising receiving a distance designation at the first mobile device, wherein the distance designation includes a threshold distance at which the first mobile device is to receive the notification, and wherein the threshold distance comprises a distance between the first mobile device and the second mobile device.

7. The method of claim 6, further comprising providing the distance designation to the server.

8. The method of claim 1, further comprising implementing an automated visibility designation based on one or more previously received visibility designations.

9. The method of claim 1, wherein the notification is triggered based on a zoom operation or a pan operation performed on a map screen of the second mobile device.

10. An apparatus comprising:
a processor;
a receiver operatively coupled to the processor and configured to receive a notification that a mobile device associated with a buddy of a user of the apparatus is going to detect a location of the apparatus;
an interface operatively coupled to the processor and configured to receive, in response to the notification, a visibility designation, wherein the visibility designation specifies a desired visibility of the apparatus by the mobile device; and
a transmitter operatively coupled to the processor and configured to provide the visibility designation to a server that is in communication with the apparatus and the mobile device.

11. The apparatus of claim 10, wherein the visibility designation controls privacy of the apparatus by preventing the mobile device from receiving the location of the apparatus.

12. The apparatus of claim 10, wherein the interface is further configured to receive a distance designation, wherein the distance designation includes a threshold distance at which the apparatus is to receive the notification, and wherein the threshold distance comprises a distance between the apparatus and the mobile device.

13. The apparatus of claim 12, wherein the transmitter is further configured to provide the distance designation to the server.

14. The apparatus of claim 10, wherein the processor is configured to implement an automated visibility designation based on one or more previously received visibility designations.

15. A method comprising:
determining, at a server, that a second mobile device is going to detect a location of a first mobile device, wherein the second mobile device is associated with a buddy of a user of the first mobile device;
providing a notification to the first mobile device that the second mobile device is going to detect the location of the first mobile device;
receiving, in response to the notification, a visibility designation from the first device, wherein the visibility designation specifies a desired visibility of the first mobile by the second mobile device; and
controlling visibility of the first device by the second device based on the visibility designation.

16. The method of claim 15, wherein the visibility designation prevents the second mobile device from receiving an identity of the user of the first mobile device.

17. The method of claim 15, wherein the visibility designation identifies a time at which the second mobile device is able to receive the location of the first mobile device.

18. The method of claim 17, wherein the time is specific to the second mobile device.

19. The method of claim 15, further comprising receiving a distance designation from the first mobile device, wherein the distance designation includes a threshold distance at which the first mobile device is to receive the notification, and wherein the threshold distance comprises a distance between the first mobile device and the second mobile device.

20. The method of claim 15, wherein the notification is triggered based on a zoom operation or a pan operation performed on a map screen of the second mobile device.

21. The method of claim 15, wherein the determining that the second mobile device is going to detect the location of the first mobile device is based on a location of the second mobile device, a bearing of the second mobile device, and a velocity of the second mobile device.

22. An apparatus comprising:
a processor configured to determine that a second mobile device is going to detect a location of a first mobile device, wherein the second mobile device is associated with a buddy of a user of the first mobile device;
a transmitter operatively coupled to the processor and configured to provide a notification to the first mobile device that the second mobile device is going to detect the location of the first mobile device; and
a receiver operatively coupled to the processor and configured to receive, in response to the notification, a visibility designation from the first mobile device, wherein the visibility designation specifies a desired visibility of the first mobile device by the second mobile device,
wherein the processor is further configured to control visibility of the first device by the second device based on the visibility designation.

23. The apparatus of claim 22, wherein the receiver is further configured to receive an indication of a zoom operation or a pan operation performed on a map screen of the second mobile device.

24. The apparatus of claim 23, wherein the notification is triggered based on the zoom operation or the pan operation performed on the map screen of the second mobile device.

25. The apparatus of claim 22, wherein the receiver is further configured to receive a distance designation from the first mobile device, wherein the distance designation includes a threshold distance at which the first mobile device is to receive the notification, and wherein the threshold distance comprises a distance between the first mobile device and the second mobile device.

26. A non-transitory computer-readable medium having instructions stored thereon, the instructions comprising:
instructions to receive, at a first mobile device, a notification that a second mobile device associated with a buddy of a user of the first mobile device is going to detect a location of the first mobile device;
instructions to receive, in response to the notification, a visibility designation, wherein the visibility designation specifies a desired visibility of the first mobile device by the second mobile device; and
instructions to provide the visibility designation to a server that is in communication with the first mobile device and the second mobile device.

27. The non-transitory computer-readable medium of claim 26, wherein the visibility designation controls privacy of the first mobile device by preventing the second mobile device from receiving the location of the first mobile device.

28. The non-transitory computer-readable medium of claim 26, wherein the visibility designation prevents the second mobile device from receiving an identity of the user of the first mobile device.

29. The non-transitory computer-readable medium of claim 26, further comprising instructions to receive a distance designation at the first mobile device, wherein the distance designation includes a threshold distance at which the first mobile device is to receive the notification, and wherein the threshold distance comprises a distance between the first mobile device and the second mobile device.

30. The non-transitory computer-readable medium of claim 26, wherein the notification is triggered based on a zoom operation or a pan operation performed on a map screen of the second mobile device.

* * * * *

UNITED STATES PATENT AND TRADEMARK OFFICE
CERTIFICATE OF CORRECTION

PATENT NO.         : 8,417,262 B2                              Page 1 of 1
APPLICATION NO.    : 12/617844
DATED              : April 9, 2013
INVENTOR(S)        : Loeb et al.

It is certified that error appears in the above-identified patent and that said Letters Patent is hereby corrected as shown below:

On the Title Page, in Item (56), under "OTHER PUBLICATIONS", in Column 2, Lines 1-2, delete "PCT/US/10/27069," and insert -- PCT/US10/27069, --, therefor.

On the Title Page, in Item (57), under "ABSTRACT", in Column 2, Line 3, delete "comprising;" and insert -- comprising: --, therefor.

In the Specification

Figure 1:
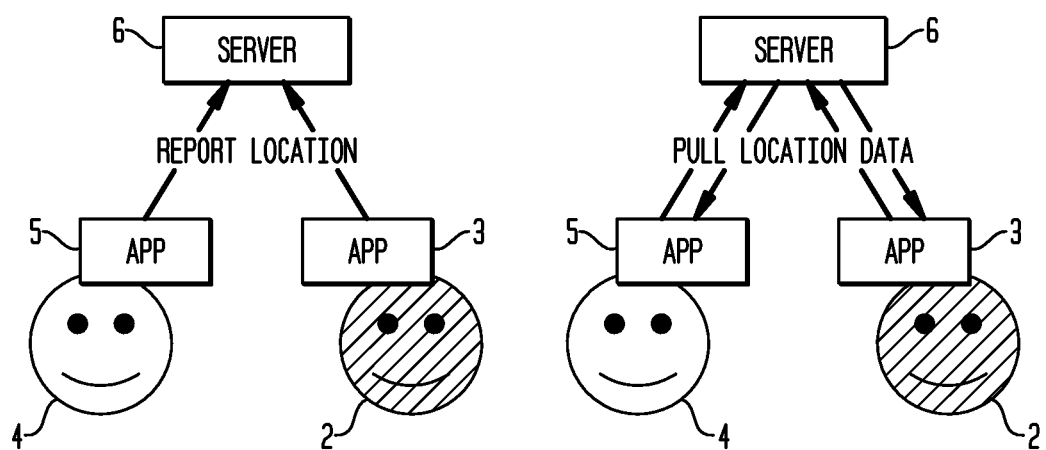
FIG. 1 illustrates a prior art buddy locator service.

In Column 1, Line 53, delete "FIG. 1." and insert -- FIG. 1 --, therefor.

In Column 3, Line 20, delete "illustrate" and insert -- illustrates --, therefor.

In Column 5, Line 7, delete "manager 20" and insert -- encounter manager 20 --, therefor.

In Column 5, Line 60, delete "13's" and insert -- B's --, therefor.

In Column 5, Line 65, delete "13's" and insert -- B's --, therefor.

Signed and Sealed this
Twenty-second Day of October, 2013

Teresa Stanek Rea
*Deputy Director of the United States Patent and Trademark Office*